H. H. BOYCE.
INDICATING SYSTEM AND APPARATUS FOR INTERNAL COMBUSTION ENGINES.
APPLICATION FILED JAN. 3, 1913.
1,090,776.
Patented Mar. 17, 1914.
2 SHEETS—SHEET 1.
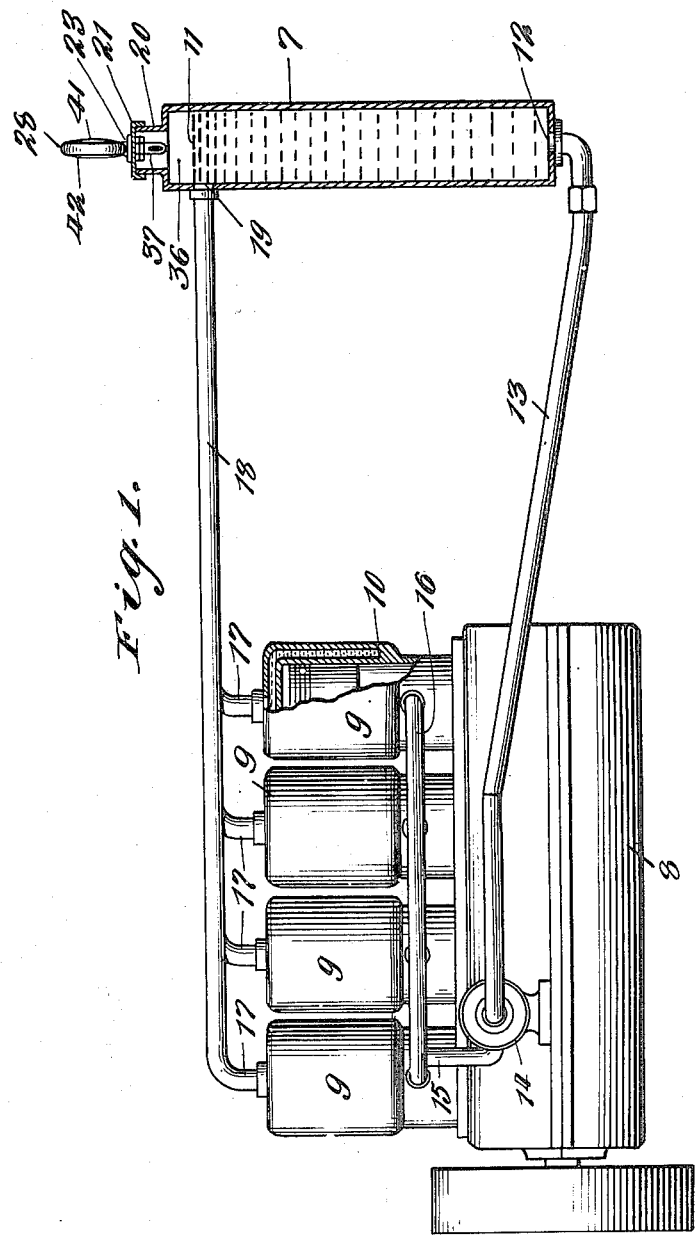

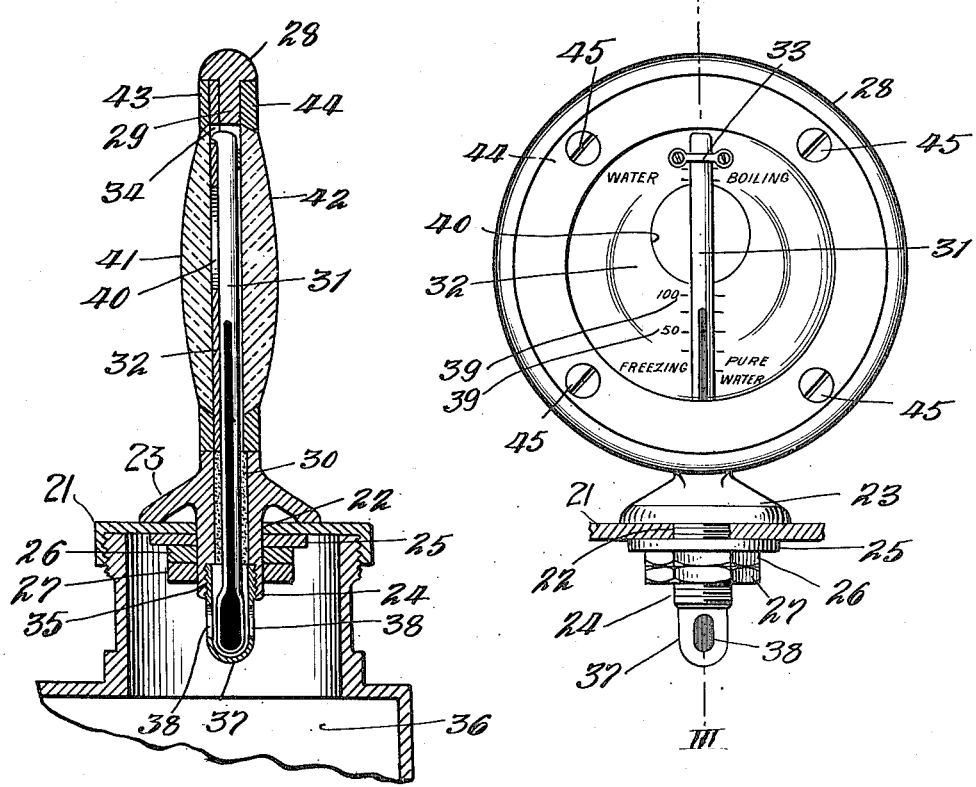

UNITED STATES PATENT OFFICE.

HARRISON HURLBERT BOYCE, OF OYSTER BAY, NEW YORK.

INDICATING SYSTEM AND APPARATUS FOR INTERNAL-COMBUSTION ENGINES.

1,090,776. Specification of Letters Patent. Patented Mar. 17, 1914.

Application filed January 3, 1913. Serial No. 739,978.

*To all whom it may concern:*

Be it known that I, HARRISON HURLBERT BOYCE, a citizen of the United States, residing at Oyster Bay, in the county of Nassau and State of New York, have invented certain new and useful Improvements in Indicating Systems and Apparatus for Internal-Combustion Engines, of which the following, taken in connection with the accompanying sheets of drawings, forms a complete and concise description.

This invention relates to a system for indicating the condition of internal combustion engines of various types, and particularly of those styles wherein the cylinders are cooled by a fluid medium which is circulated therearound or thereabout, the indicating means being located without or not in direct contact with the cylinders.

While my invention is generally applicable to stationary and other explosive engines of any character and under varying conditions of service, it is especially adaptable for use in connection with automobiles and the like wherein the engine cylinders are cooled by a liquid delivered or supplied thereto through any suitable medium, as, for instance, from a radiator or the like, which is customarily situated some distance away from the engine cylinders, though I would have it expressly understood that I in no wise limit myself to this specific application or embodiment of my invention, which I have selected as a basis for illustrating and describing my invention, merely for the purpose of rendering a clear and comprehensive understanding of the scope and novel features thereof.

My invention broadly comprehends the provision or arrangement of means for indicating the condition or temperature of the engine, the action of the temperature indicating means being governed or controlled by the water or other circulating medium employed for producing such variations in the temperature of the cylinders as may be necessary or desired by the operator.

I have found that many, if not most of the troubles to which internal combustion engines are subject result directly or indirectly in a change in the temperature of the engine and cooling system, this being true for instance of such contingencies as imperfect lubrication, improper adjustment of the carbureter, insufficient water in the radiator, failure of proper circulation of the cooling water, broken fan belt, etc., and it is an object of the present invention to provide an effective indicator governed by such changes of temperature which will call to the attention of the operator the existence of conditions inimical to the satisfactory operation of the engine, arising from any of these or similar causes.

I shall now proceed to describe one embodiment of my invention with reference to the accompanying drawings, which show a specific application thereof, and then proceed to point out with more particularity, the essential elements of novelty in the annexed claims.

In the drawings; Figure 1 is a diagrammatic view of one embodiment of my invention showing the radiator in section with my preferred form of indicator attached thereto. Fig. 2 is a front elevation of the indicator shown in Fig. 1. Fig. 3 is a vertical section on the line III—III of Fig. 2, showing the manner in which the indicator is fastened to the radiator cap, the thermometer extending into the air space therewithin.

Referring now to the drawings in detail, which illustrate an embodiment of my invention in connection with an explosive engine and cooling system, such as is ordinarily employed in automobiles, like reference numerals being employed to designate similar parts throughout the several views, 7 is a radiator of the usual type employed in connection with the particular application of my invention now being described, and which is customarily located forward of and some distance from the engine 8. The engine 8 in the present instance is, as shown, of the four-cylinder type, the cylinders being indicated by 9, each of them being provided with the customary water jacket as shown at 10, in Fig. 1, the casing of the forward cylinder being partly cut away for the illustration thereof.

The cooling medium which, in the specific system now being described, is water is shown in dotted lines within the radiator 7, the normal level thereof being indicated by 11. The cooling fluid flows through the outlet 12 preferably located at the bottom of the radiator, through a pipe or connection 13 to the usual pump 14, preferably of the centrifugal type, which communicates with the water jackets of the individual cylinders, through the agency of the pipes 15 and 16. The cooling fluid is thereby caused to circulate through and about the water jackets of the individual cylinders, leaving the jackets of the cylinders by means of the short connecting pipes designated by the numeral 17, which lead into the return pipe 18, opening into the radiator 7, as shown at 19, and in proximity to the top thereof.

For supplying and replenishing the radiator with the cooling fluid, the same is provided with the customary opening 20, having the usual cap 21 preferably threaded thereon. The top of this cap 21 is centrally apertured at 22 for the reception of the indicating means, which I employ in connection with my system, the detail construction of which may, however, be varied to attain the object of my invention, but which I will now describe as illustrated in the drawings, and which I have found to be a most satisfactory and desirable form thereof.

The indicator is secured to the inlet cap 21 and supported thereon by means of an annular flange 23, preferably formed integral with the frame of the indicator, and a screw threaded protuberance 24 which extends downwardly within the aperture or opening 22 in the radiator cap 21, the washer or gasket 25 passing thereover and engaging with the under surface of the cap 21, the lock nuts 26 and 27 being screwed home on the protuberant portion 24 thereby firmly clamping the top portion of the cap between the flange 23 and the washer 25 and making the indicator rigid therewith.

The body or frame portion 28 of my preferred form of indicator of which the flange 23 is a part, is annular in configuration, and is provided at its upper part with a downwardly depending flange or portion 29, which serves as a rest or support for the magnifying lenses or crystals, and their retaining rings when in assembled position, as will be hereinafter apparent.

Positioned centrally of the device and supported within the frame 28, but preferably thermally insulated therefrom by a concrete or other non-conducting filling 30 is a thermometer 31, the upper portion thereof being secured to the circular plate or disk 32 by the strap 33, the teat or extremity of the thermometer being seated within the orifice 34 in said plate. As will be observed, the lower portion of the thermometer extends through the protuberant portion 24, which is provided with a central bore 35 for the purpose, the enlarged portion or bulb thereof extending below the plane of the protuberance 24 and within the air space or pocket 36 formed in the inlet 20 and the upper part of the radiator above the level of the water within the radiator 7, the bulb being protected against fracture or breakage by a thimble or cap 37 formed of metal or the like threaded into the bore of the protuberance 24 and provided with a plurality of apertures or holes 38 as shown in Fig. 3.

It will be apparent from the foregoing that the bulb of the thermometer 31, extending into the air space 36 will cause the indicating fluid, which may be alcohol, glycerin, or any other suitable medium which will retain its homogeneity or solidity regardless of the vibration of the system of which it is a part, to respond to changes in the temperature of the atmosphere within the air space 36, which is in proximity to the point of inflow 19 of the heated water coming from the cylinder jackets.

The plate 32 to which the thermometer 30 is secured is positioned to the rear thereof, its front face being provided with the graduations 39 to indicate the degree of rise and fall of the fluid within the tube, and is formed with a centrally located sight opening or window 40 which enables the operator of the engine of which my system is a part to instantly detect any sudden or abnormal rise or change in the temperature of the engine, the reflection from the headlight of the car serving to throw the indicating fluid within the tube into relief at night. Furthermore, the employment of the magnifying lenses 41 and 42 positioned forwardly and rearwardly of the frame enlarge or magnify the tube of the thermometer so that the movement of the indicating fluid may be easily observed and noted even at a distance therefrom, the provision of the sight opening making the operator fully aware of the condition of his engine either by day or by night.

The lenses or crystals 41, 42 together with their retaining rings 43 and 44, and the plate 32 are firmly and securely fastened to the frame of the indicator by the screws 45 passing therethrough as shown in Fig. 2 thus producing a compact arrangement which will withstand considerable shock and will not be affected by the vibration of the vehicle or part thereof to which it is attached.

Under normal running conditions of the engine, the temperature of the atmosphere within the radiator air space 36 is such as to render the indicating fluid within the tube or thermometer visible just above the lower portion of the sight aperture 40. Should the engine run hot, however, or any other contingency arise which would tend to raise the temperature of the cooling fluid, the indicating medium will expand across the sight opening 40, immediately notifying the observer of the existence of trouble and call upon him to remedy the same.

An important feature of my indicating apparatus or system in its preferred form, is that the heat responsive element of the indicator is not submerged in the water within the radiator, but is located in a space or pocket above the normal water-level. The reason for this is that it is not the purpose of the present apparatus merely to indicate the temperature of the cooling water, but the invention has a far broader and more important aspect, namely, that of indicating the actual condition of the engine so as to serve as a guide for its safe and efficient operation. In the first place, by locating the heat responsive element of the indicator in the air space above the water level, a much more effective danger signal is produced. This will be appreciated when it is understood that the temperature of the air in the space above the water is usually considerably lower than the temperature of the water, often 30 or 40 degrees lower, under normal running conditions. On the other hand, when the engine heats up to a point when the water in the cylinder jackets commences to boil, which marks the beginning of dangerous conditions, the air space above the water level fills with steam which at once causes a sudden and considerable rise in the temperature within such space. Thus upon the heating of the engine to the danger point the air space may be subjected to a quick rise in temperature, often as much as 30 to 50 degrees, while the actual rise in temperature of the circulating water may not exceed 5 to 10 degrees. Correspondingly the indicator, the temperature responsive element of which is located in the air space, will show a much more impressive change in reading than would be the case if it were influenced only by the comparatively slight rise in temperature of the circulating liquid.

In the particular form of apparatus illustrated, the indicating column, when the instrument is subjected to steam temperature, passes almost immediately entirely across the sight opening 40. On the other hand, if the bulb were submerged in the hot liquid in the upper part of the radiator, the column might normally stand at say 205 degrees without indicating a dangerous condition within the engine so that the rise of the engine temperature from the safe condition of 205 degrees to the dangerous condition of 212 degrees would be marked only by the corresponding small rise of the liquid column, a movement so slight as to be hardly noticeable. In this way a very dangerous change in engine conditions might occur without attracting the notice of the operator. When a liquid expansion thermometer is used, the obtaining of this sudden extensive rise in temperature is particularly desirable, as it is obviously impracticable to use a thermometer having a long tube, which would be both unsightly and structurally inconvenient and unsafe. By using a short tube thermometer, the entire range of temperature to be indicated can be compressed within a comparatively small space and at the same time the comparatively small rise for small changes of temperature is not objectionable as a sudden and large rise is insured immediately upon the occurrence of a condition of danger within the engine. It is to be understood, however, that my invention in its broader aspects is in no way limited to the use of a liquid expansion thermometer, as any sort of thermostatic or temperature responsive element or means may be employed without departing therefrom. Another disadvantage which would occur if the thermometer bulb or other heat responsive element of the indicator were normally submerged in the liquid, would be the failure of the indicator to give a correct reading upon the falling of the water level within the radiator. For example, if the water level should fall owing to leakage or other cause until it was below the bulb, the bulb would then be exposed to the air above the water level, which, as before stated, is normally cooler than the water so that a drop in temperature would be indicated by the instrument instead of the rise in temperature which would actually take place in the water. This objection is avoided where the heat responsive element is normally located in the air space.

Probably the most important advantage of locating the bulb or heat responsive element in the air space instead of submerging it in the cooling liquid is that it will indicate a condition of danger upon the stoppage of the circulation of the liquid, while the submerged bulb will frequently fail to give such indication. This will be understood when it is considered that the submerged bulb registers the temperature of the water in the radiator, which upon the stoppage of the circulation gets cooler and cooler and does not respond to the engine temperature. Accordingly the instrument will ordinarily show a fall of temperature, even though the water may be steaming in the cylinder jackets. If the heat responsive element of the indicator is mounted in the air space above the water level, however, as soon as steam is formed in the cylinder jackets, it will find its way into such air space whether the water is circulated or not, and therefore, will immediately cause the rapid rise of the indicating fluid and give the essential danger signal. Thus the placing of the heat responsive element in the air space above the water level produces an instrument indicating the condition of the engine under any and all circumstances, while if the heat responsive element were actually inserted in the cooling liquid, it would often fail to indicate danger under one of the most injurious conditions which can possibly occur in internal combustion engines, namely, the stoppage of the circulation of the cooling liquid.

Certain features of invention embodied in the apparatus shown in this application are not claimed herein as the same form the subject-matter of another application filed by me, Serial No. 726,270.

While I have described one particular embodiment of my invention as illustrative of the principle thereof, it is to be understood that I do not limit myself to such embodiment but desire to cover the novel principle of my invention broadly and in the various applications of which it is susceptible.

In certain of the claims I have referred to the indicating device or temperature responsive element thereof as being normally permanently so located as to be influenced by the temperature of that part of the cooling system above the level of the water therein by which expression it is intended to convey the idea that the indicating device is an integral part of the system during the normal operation of the engine as distinguished from a temporarily introduced temperature measuring instrument. In this way an indicating device or signal is provided which forms an always present danger signal or guide for the operator indicating to him the condition of the engine and enabling him to secure the best results while operating the same.

Having thus described my invention, what I claim as new herein and desire to secure by Letters Patent is:

1. In a system for indicating abnormal conditions in an internal combustion engine having a liquid circulation cooling system for the cylinders of the engine, the combination with means forming an inclosed space above the level of the circulating liquid, of an indicating device having a temperature responsive element normally permanently so located with reference to said inclosing means as to respond to temperature changes in said inclosed space and means controlled by said element for giving a temperature change indication outside said space.

2. In a system for indicating abnormal conditions in an internal combustion engine provided with a liquid circulation cooling system for the cylinders of the engine, said cooling system including a radiator having an air space at the top thereof, the combination with the radiator of an indicating device having an indicating part outside the radiator and having a temperature responsive element controlling the operation of said indicating part and exposed to the temperature in said air space above the level of the liquid in the radiator and means for maintaining the temperature responsive element in place in the radiator during the normal operation of the engine.

3. In a system for indicating abnormal conditions in an internal combustion engine provided with a liquid circulation cooling system for the cylinders of the engine, said cooling system including a radiator having an air space therein above the level of the circulating liquid and having a filler opening closed by a cap, the combination with the radiator and cap of an indicating device normally permanently mounted on said cap and having a normally visible indicating part and a temperature responsive element controlling the operation of said indicating part and exposed to temperatures within the air space.

4. In a system for indicating abnormal conditions in an internal combustion engine provided with a liquid circulation cooling system for the cylinders of the engine, said cooling system including a radiator having an air space therein above the level of the circulating liquid, the combination with the radiator of an indicating device normally permanently carried by said radiator and comprising an exposed protective casing, a visible indicating part in said casing, and a temperature responsive element controlling the operation of said indicating part and normally located in the air space in the radiator.

5. In a system for indicating abnormal conditions in an internal combustion engine provided with a liquid circulation cooling system for the cylinders of the engine, said cooling system including a radiator having an air space therein above the level of the circulating liquid and having a filler opening closed by a cap, the combination with the radiator and cap of an indicating device normally permanently attached to said cap and comprising an exposed protective casing, an indicating part in said casing and a temperature responsive element controlling the operation of said indicating part and normally located in the air space in said radiator.

6. In a system for indicating abnormal conditions in an internal combustion engine provided with a liquid circulation cooling system for the cylinders of the engine; said cooling system including a radiator having an air space therein above the level of the circulating liquid, the combination with the radiator of an indicating device normally permanently carried by said radiator and comprising a thermometer having a bulb normally located in said air space at the top of the radiator and having an outwardly projecting visible tube, and a protective casing for the projecting portion of said tube.

In witness whereof, I have hereunto set my hand in the presence of two subscribing witnesses.

HARRISON HURLBERT BOYCE.

Witnesses:
P. FRANK SONNEK,
WM. C. DUNN.